(12) United States Patent
Jokela et al.

(10) Patent No.: US 9,045,694 B2
(45) Date of Patent: Jun. 2, 2015

(54) METHOD OF CARRYING OUT PYROLYSIS AND PYROLYSIS APPARATUS

(75) Inventors: Pekka Jokela, Espoo (FI); Jani Lehto, Tampere (FI)

(73) Assignee: VALMET TECHNOLOGIES OY, Tampere (FI)

( * ) Notice: Subject to any disclaimer, the term of this patent is extended or adjusted under 35 U.S.C. 154(b) by 801 days.

(21) Appl. No.: 13/375,351

(22) PCT Filed: Jun. 1, 2010

(86) PCT No.: PCT/FI2010/050443
§ 371 (c)(1),
(2), (4) Date: Nov. 30, 2011

(87) PCT Pub. No.: WO2010/139854
PCT Pub. Date: Dec. 9, 2010

(65) Prior Publication Data
US 2012/0073185 A1    Mar. 29, 2012

(30) Foreign Application Priority Data
Jun. 2, 2009 (FI) .................................. 20095614

(51) Int. Cl.
*C10B 53/00* (2006.01)
*C10B 49/22* (2006.01)
(Continued)

(52) U.S. Cl.
CPC . *C10B 49/22* (2013.01); *C10G 9/32* (2013.01);
*C10B 49/10* (2013.01); *C10B 55/10* (2013.01);
*C10G 1/02* (2013.01); *C10B 57/10* (2013.01);
(Continued)

(58) Field of Classification Search
CPC .......... C10B 1/06; C10B 47/20; C10B 47/24;
C10B 53/00; C10B 57/10; C10B 49/10;
C10B 53/10; C10G 1/02; C10G 9/32
USPC ................ 201/12, 31, 16; 202/135, 262, 269;
48/113, 111, 119, 197 FM
See application file for complete search history.

(56) References Cited

U.S. PATENT DOCUMENTS 4,274,941 A    6/1981 Janssen et al.
6,949,224 B1 *  9/2005 Miyoshi et al. ............... 422/139
(Continued)

FOREIGN PATENT DOCUMENTS

EP    2 107 098 A2    10/2009
EP    2 107 099 A2    10/2009
(Continued)

OTHER PUBLICATIONS

International Search Report, PCT/FI2010/050443, Nov. 11, 2010.

*Primary Examiner* — Nina Bhat
(74) *Attorney, Agent, or Firm* — Birch, Stewart, Kolasch & Birch, LLP (57) ABSTRACT

The invention relates to a method of carrying out pyrolysis process in a pyrolysis reactor for solid fuel to produce pyrolysis oil. The method comprises supplying solid fuel into a drying zone in the pyrolysis reactor for removing moisture containing gases, drying the solid fuel in the drying zone and extracting the moisture containing gases removed from the solid fuel out of the pyrolysis reactor, passing the dried solid fuel from the drying zone to the pyrolysis zone of the pyrolysis reactor, pyrolyzing the dried solid fuel for separating pyrolysis gases from the dried solid fuel and conducting the pyrolysis gases from the pyrolysis reactor to a condenser for producing pyrolysis oil.

39 Claims, 7 Drawing Sheets

(51) Int. Cl.
  *C10G 9/32* (2006.01)
  *C10B 49/10* (2006.01)
  *C10B 55/10* (2006.01)
  *C10G 1/02* (2006.01)
  *C10B 57/10* (2006.01)
  *C10B 49/16* (2006.01)
  *C10B 53/02* (2006.01)
  *F23C 10/00* (2006.01)

(52) U.S. Cl.
  CPC ............... *C10B 53/00* (2013.01); *C10B 49/16* (2013.01); *C10B 53/02* (2013.01); *F23C 10/002* (2013.01); *F23G 2201/303* (2013.01); *F23G 2203/501* (2013.01); *F23G 2203/504* (2013.01); *F23G 2206/10* (2013.01); *Y02E 50/14* (2013.01)

(56) References Cited

U.S. PATENT DOCUMENTS 8,287,697 B2 * 10/2012 Honkola et al. ............... 201/12
8,550,224 B2 * 10/2013 Bauer ............................ 188/371
2008/0149012 A1 * 6/2008 Dernjatin et al. ............. 110/245

FOREIGN PATENT DOCUMENTS

| WO | WO 2005/033250 A2 | 4/2005 |
| WO | WO 2009/047387 A1 | 4/2009 |
| WO | WO 2009/047392 A1 | 4/2009 |

* cited by examiner

METHOD OF CARRYING OUT PYROLYSIS AND PYROLYSIS APPARATUS

FIELD OF THE INVENTION

The present invention relates to method for carrying out pyrolysis and more particularly to a method of carrying out pyrolysis process in a pyrolysis apparatus for solid fuel to produce pyrolysis oil. The present invention further relates to a pyrolysis apparatus and more particularly to a pyrolysis apparatus comprising a pyrolysis reactor for pyrolysing solid fuel and a condenser for condensing pyrolysis gases separated from the solid fuel into pyrolysis oil.

BACKGROUND OF THE INVENTION

In this application pyrolysis means converting fuel in inert conditions and in high temperature into gaseous state, which forms oil-like, different organic compounds comprising liquid as it condensed. Inert conditions mean oxygen-free conditions where no combustion of the fuel occurs. Tar burning is one example of long known prior art pyrolysis process.

One possibility for a pyrolysis process is a process based on using a fluidized bed technique. In this process solid feedstock is fed to a reactor comprising a fluidized bed of hot inert bed material e.g. sand. Inert fluidizing gas is used to fluidize the bed. The feedstock will mix with the bed material, pyrolyze and form pyrolysis gases that are conducted out from the reactor. The heat for the pyrolysis process can be provided for example arranging the pyrolysis reactor next to a fuel burning fluidized bed and circulating the thus heated bed material to the pyrolysis reactor. The solid feedstock used in pyrolysis is dried in a thermal dryer before it is fed to the pyrolysis reactor. Usually the dryer is a separate drying apparatus. Thus the biomass is first dried and then conducted to the pyrolysis reactor.

In the pyrolysis process fuel is pyrolyzed, formed gaseous compounds, i.e. pyrolysis gases are separated from the char residue and the pyrolysis gases are condensed into pyrolysis oil. Pyrolysis oil may be used as fuel or refined into different chemicals. Production of pyrolysis oil from different kinds of biomass, for example from wood fuels, is studied for replacing coal and heavy fuel oil.

Pyrolysis oil produced by pyrolysis contains optimally 25 weight-% water. If the water content is much higher, the product may end up to unwanted phase separation and end use of the pyrolysis oil becomes difficult or alcohol has to be added to the pyrolysis oil. On the other hand, if the water content is too low, the viscosity of the pyrolysis oil will increase and end usage will get more difficult. This means that the water content in pyrolysis oil has to be maintained in certain range. Water or moisture content varies with different biomass for example wood, wood chips, peat or other biomass. Reaching the 25 weight-% water or moisture content in pyrolysis oils means that the biomass has to be dried to moisture content 10 weight-% at most, preferably about 4 to 10 weight-% and more preferably 5 to 8 weight-%.

The moisture content of the dried biomass affects the water content of the produced pyrolysis oil. The problem with the prior art drying arrangements is that using separate drying apparatuses in drying of the biomass does not enable effective control of the water content of the produced pyrolysis oil. Thus it is difficult to adjust the pyrolysis process such that the water content produced pyrolysis oil is in optimal range. Also, as the desired moisture content of the biomass is as low as mentioned above, the biomass residence time in a dryer of a smaller size is very long. Another alternative is to increase the size of the dryer, which will result in increase of drying equipment investment price and space requirement.

BRIEF DESCRIPTION OF THE INVENTION

An object of the invention is to provide a method and an apparatus avoiding the above described problems.

The objects of the present invention are achieved with a method of carrying out pyrolysis process in a pyrolysis apparatus for solid fuel to produce pyrolysis oil. The objects of the present invention are further achieved with a pyrolysis apparatus comprising a pyrolysis reactor for pyrolysing solid fuel and a condenser for condensing pyrolysis gases separated from the solid fuel into pyrolysis oil.

The preferred embodiments of the invention are disclosed in the dependent claims.

In pyrolysis, when biomass is fed to the process, it will first dry and the pyrolysis of the biomass will occur after the drying. The drying and the pyrolysis have usually a definite border line. This phenomena is utilized in the present invention by conducting the drying of the biomass in the same process and reactor as pyrolysis. Therefore the pyrolysis process in a pyrolysis reactor is divided into drying zone and pyrolysis zone. The moisture separated from the biomass in the drying zone will be removed from the pyrolysis reactor and the dried biomass is further passed to the pyrolysis zone for pyrolysis. This arrangement enables the moisture content of the pyrolysis oil to be controlled by controlling the drying of the biomass in the pyrolysis reactor to produce pyrolysis oil that will have the optimum water content. Control of the drying of the biomass can be integrated into the online pyrolysis oil water content analyser.

The advantage of the present invention is that it enables effective control of the water content of the produced pyrolysis oil by adjusting the drying of the biomass. The drying zone is arranged inside the pyrolysis reactor. Thus the drying and the pyrolysis are carried out in the same reactor.

Another advantage is that the need for separate, expensive and space consuming dryer is eliminated.

BRIEF DESCRIPTION OF THE DRAWINGS

In the following the invention will be described in greater detail by means of preferred embodiments with reference to the at accompanying drawings, in which.

DETAILED DESCRIPTION OF THE INVENTION

The present invention relates to a method of carrying out pyrolysis process for solid fuel to produce pyrolysis oil. The pyrolysis process carried out is preferably so called fast pyrolysis. According to the basic principle of the present invention, the pyrolysis process in the pyrolysis reactor is divided into drying for drying the biomass and pyrolysis for pyrolyzing the dried biomass. The drying of the biomass is conducted in the drying zone of the pyrolysis reactor and the pyrolysis of the dried biomass is carried out in the pyrolysis zone. Thus the pyrolysis process is divided into a drying zone and a pyrolysis zone, the drying zone being arranged upstream from the pyrolysis zone in the movement direction of the biomass in the pyrolysis process.

In the present application and claims the following have meaning as defined below: The term "solid fuel" refers to all kind of substantially solid biomass that is pyrolyzed in a pyrolysis reactor. The solid fuel can be any solid biomass, such as wood, wood chips, saw dust, firewood, forest residue, urban wood waste, by products and waste of the papermaking industry, lumber waste and peat. Even though the material to be pyrolyzed is called solid fuel, it should be noted that the material will not burn in the pyrolysis process, but releases combustable gases that may be condensed into liquid form. The term "pyrolysis gases" refers to gases that are formed in pyrolysis and that will be condensated in the process to form pyrolysis oil. The term "moisture containing gases" refers to gases separated from the solid fuel in the drying zone of the pyrolysis reactor prior to pyrolysis of the solid fuel in the pyrolysis zone.

The solid fuel is preferably dried to a moisture content of 10 weight-% at most, preferably about 4 to 10 weight-% and more preferably 5 to 8 weight-% in the drying zone. During the pyrolysis process the moisture content of the produced pyrolysis oil is analyzed for controlling the drying of the solid fuel in the drying zone. The analysis of the moisture content of the produced pyrolysis oil may be done for example with online water content analyser. The measurements may be used for controlling the drying process of the solid fuel in the drying zone by adjusting the removal rate of the moisture containing gases from the drying zone. Alternatively the drying of the solid fuel in the drying zone may be controlled by adjusting residence time of the solid fuel in the drying zone. The residence time of the solid fuel may be controlled by adjusting the movement speed of the solid fuel in the drying zone. Furthermore, the drying of the solid fuel in the drying zone may be controlled by controlling the temperature in the drying zone. The above discussed methods for controlling the drying of the solid fuel may be used separately or in any combination. According to the above mentioned methods the water content of the produced pyrolysis oil may be controlled by adjusting the process parameters of the pyrolysis process itself, particularly in the drying zone of the pyrolysis reactor.

In one preferred embodiment, the pyrolysis process according to the present invention is carried out in connection with a fluidized bed boiler. In that case solid fuel is supplied to a pyrolysis reactor and heat required for the pyrolysis is brought to the pyrolysis reactor at least partly with solid, particle like, bed material of the fluidized bed boiler. The bed material of the fluidized bed boiler is circulated through the pyrolysis reactor and fluidized in the pyrolysis reactor by fluidizing gas. The temperature of the bed material 40 is approximately 850° C. in the fluidized bed boiler 30 and approximately 700° C. in the pyrolysis reactor 4. The pyrolysis gases produced from the dried solid fuel in the pyrolysis reactor are condensed into liquid form as so called pyrolysis oil. Preferably in the method the bed material coming from the fluidized bed boiler and the solid fuel are passed through the pyrolysis reactor in transverse direction in relation to the flow direction of the fluidizing gas in the pyrolysis reactor. According to the method carried out in connection with a fluidizing bed boiler the pyrolysis reactor is divided into a drying zone and a pyrolysis zone in the movement direction of the solid fuel and the bed material for drying the solid fuel prior to the pyrolysis of the solid fuel in the pyrolysis reactor. This means that the heat and thermal energy brought to the pyrolysis reactor by the bed material is used for pyrolyzing the solid fuel in the pyrolysis zone as well as for drying the solid fuel in the drying zone. That means that the thermal energy of the bed material of a fluidized bed boiler is used as a source of thermal energy in the pyrolysis reactor. The moisture containing gases separated from the solid fuel in the drying zone are removed from the drying zone and the dried solid fuel is passed to the pyrolysis zone to be pyrolyzed. The pyrolysis gases comprising tar-rich gases are removed from the pyrolysis reactor in the pyrolyzing zone.

The bed material and the solid fuel are passed essentially in horizontal direction through the pyrolysis reactor. The drying zone and the pyrolysis zone may be divided to two sections, a drying section and a pyrolysis sections by a separating wall. There are holes provided in the wall to enable the travelling of the bed material and solid fuel from the drying section to the pyrolysis section. The bed material moves in the pyrolysis reactor according to the principle of communicating vessels, because when fluidized, it behaves the same way as fluids. The speed of movement of the bed material and solid fuel can be expedited by positioning the fluidizing nozzles to provide the fluidizing air to the preferred direction.

By dividing the pyrolysis reactor into different sections, it is possible to remove the moisture containing gases separated from the solid fuel in the drying zone and the pyrolysis gases separated in the pyrolysis zone separately and use them in different purposes. Both of these gases rise upwards, above the fluidized bed in the pyrolysis reactor and can be removed from the reactor. No separate gas removing or bed material removing equipment is needed. The drying may be controlled in the drying zone by adjusting temperature of the solid bed material in the drying zone or before it is introduced to the drying zone. The moisture containing gases removed from the solid fuel may be fed to the fluidized bed boiler to be incinerated. The pyrolysis process according to the present invention may be carried out in connection of a bubbling fluidized bed boiler or a circulating fluidized bed boiler by feeding bed material from these boilers to the pyrolysis process.

Figure 1:
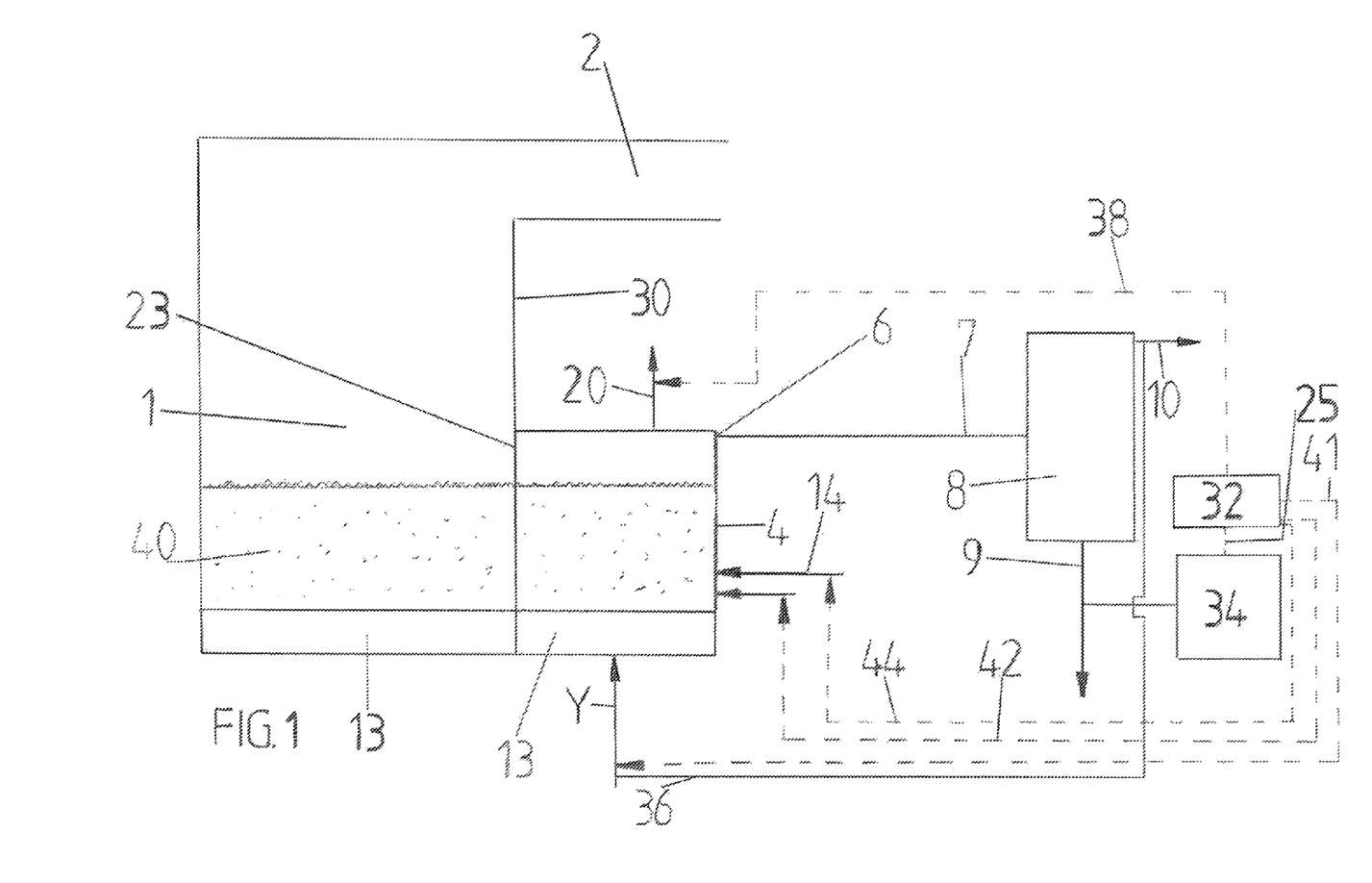
FIG. 1 is schematic view of a pyrolysis reactor arranged in connection with a bubbling fluidized bed boiler.

In FIG. 1 it is schematically shown one embodiment of a pyrolysis apparatus according to the present invention arranged in connection with a bubbling fluidized bed boiler 30. The boiler 30 comprises a combustion chamber 1 and a flue gas channel 2. A bed material 40 composed of solid particle like material, such as sand or other inert material, is fluidized by a fluidizing air fed from the windbox 13 through fluidizing nozzles (not shown in the figure) to form a fluidized bed in the combustion chamber 1. Means for feeding liquid or solid fuel, fluidising gas and combustion air to the combustion chamber 1 are not shown. The fuel used in the boiler 30 may be the same as the solid fuel pyrolyzed in the pyrolyzing apparatus, such as wood or other biomass fuel, but also coal, liquid fuel or some other fuel may be combusted in the boiler 30. Besides pyrolysis gases, pyrolysis residue, coke, is formed from the pyrolyzed material. The coke may be burned separately from the pyrolysis process, preferably in the boiler 30.

The pyrolysis apparatus comprises pyrolysis reactor 4, which is essentially a closed chamber. The pyrolysis apparatus further comprises one or more pyrolysis gas outlets 6 for removing pyrolysis gases from the pyrolysis reactor 4 and a conduit 7 for conducting the pyrolysis gases to a condenser 8. The pyrolysis gases are condensed in the condenser 8 in one or more steps for producing pyrolysis oil, which is further conducted out of the pyrolysis apparatus via conduit 9. Gases that have not condensed in the condenser 8 are discharged via conduit 10 to be further processed. They may also be returned via conduit 36 to the pyrolysis reactor 4 and used as fluidizing gases 4 after they have been scrubbed. The gases that have not condensed may also be returned to the boiler 40.

The pyrolysis process is a continuous process utilizing the thermal energy of the bed material 40 of the fluidized bed boiler 30. As shown in FIG. 1, the pyrolysis reactor 1 is arranged in connection with the bubbling fluidized bed boiler such that the pyrolysis reactor 4 placed adjacent to the combustion chamber 1 and preferably they have a common wall 23.

Figure 2:
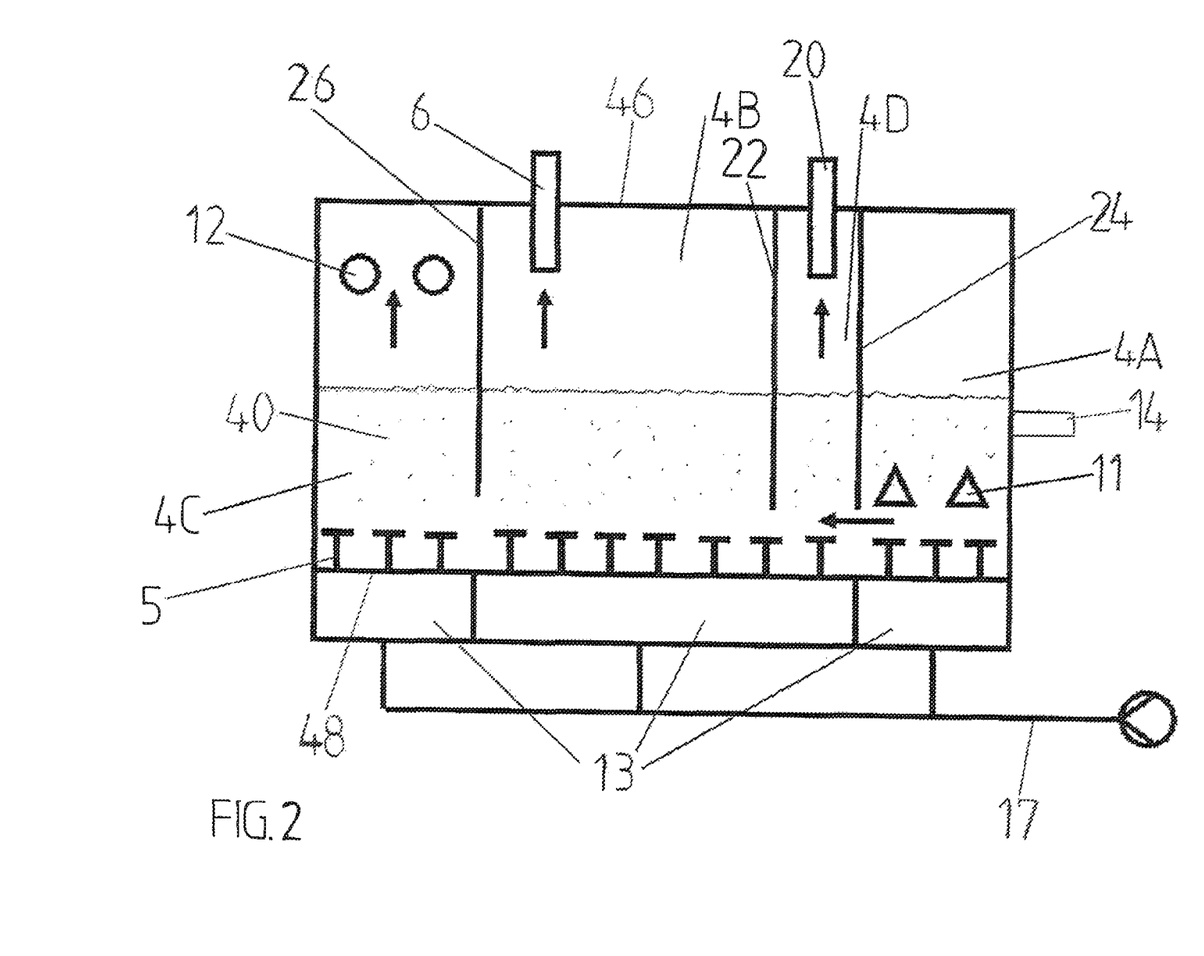
FIG. 2 shows a side view of one embodiment of a pyrolysis reactor according to the present invention.

FIG. 2 shows the schematic view of the pyrolysis reactor 4 of FIG. 1 in detail. The pyrolysis reactor 4 comprises one or more bed material inlets 11 for feeding hot bed material 40 into the pyrolysis reactor 4 from the combustion chamber 1 of the bubbling fluidized bed boiler 30 and one or more bed material outlets 12 for discharging the bed material 40 from the pyrolysis reactor 4 back to the combustion chamber 1 of the bubbling fluidized bed boiler 30. The bed material inlets 11 and the bed material outlets 12 are arranged to the wall 23 that is common to the combustion chamber 1 and pyrolysis reactor 4. The circulation of the bed material 40 through the pyrolysis reactor 4 via bed material inlets 11 and the bed material outlets 12 may be carried by means of communicating compartments. The pyrolysis reactor 4 further comprises fluidizing nozzles 5 attached on the bottom of the reactor 4 for supplying fluidizing gas into the pyrolysis reactor 4. The fluidizing gas is any suitable inert gas, such as non-condensible gases that are produced in the pyrolysis, oxygen free circulating gases, or any other inert gas, such as nitrogen. The fluidizing gas is supplied to the nozzles 5 from a windbox 13 that has a conduit 17 for introducing the fluidizing gas into it. The fluidizing nozzles 5 are arranged at spaced intervals to cover the whole distance between the bed material inlets 11 and the bed material outlets 12 to provide a cross-flow of the fluidizing gas in relation to the movement direction of the bed material 40. Thus the fluidizing nozzles 5 supply fluidizing gas substantially along the whole distance and the bed material and solid fuel are transported in fluidized state through the pyrolysis reactor. The pyrolysis reactor 4 is divided between the bed material inlets 11 and the bed material outlets 12 to a drying section 4D and a pyrolysis section 4B. The pyrolysis reactor 4 may further be divided into entry section 4A upstream of the drying section 4D, the entry section 4A comprising the bed material inlets 11, and into a discharge section 4C downstream of the pyrolysis section 4B, the discharge section 4C comprising the one or more bed material outlets 12, as shown in FIG. 2.

The solid fuel to be pyrolyzed may be supplied to the pyrolysis reactor 4 into the drying section 4D or into the entry section 4A. For that the pyrolysis reactor 4 comprises one or more supply inlets 14 for supplying solid fuel to be pyrolyzed in to the pyrolysis reactor 4. The solid fuel mixes with the bed material and moves in the pyrolysis reactor 4 along with it. According to the FIG. 2, the bed material inlets 11 and the bed material outlets 12 are at a distance from each other in the horizontal direction, from right to left in FIG. 2, and the drying section 4D and the pyrolysis section 4B are arranged between the bed material inlets 11 and the bed material outlets 12. The drying section 4D is arranged prior the pyrolysis section 4B in the movement direction of the solid fuel for drying the solid fuel prior to pyrolysis of the solid fuel. Therefore, as the solid fuel moves in the pyrolysis reactor 4, it is first dried in the drying section 4D and then pyrolyzed in the pyrolysis section 4B. Thus the solid fuel remains in the drying section 4D only time needed for drying it, and is passed to the pyrolysis section 4B before the pyrolysis essentially starts.

Figure 3:
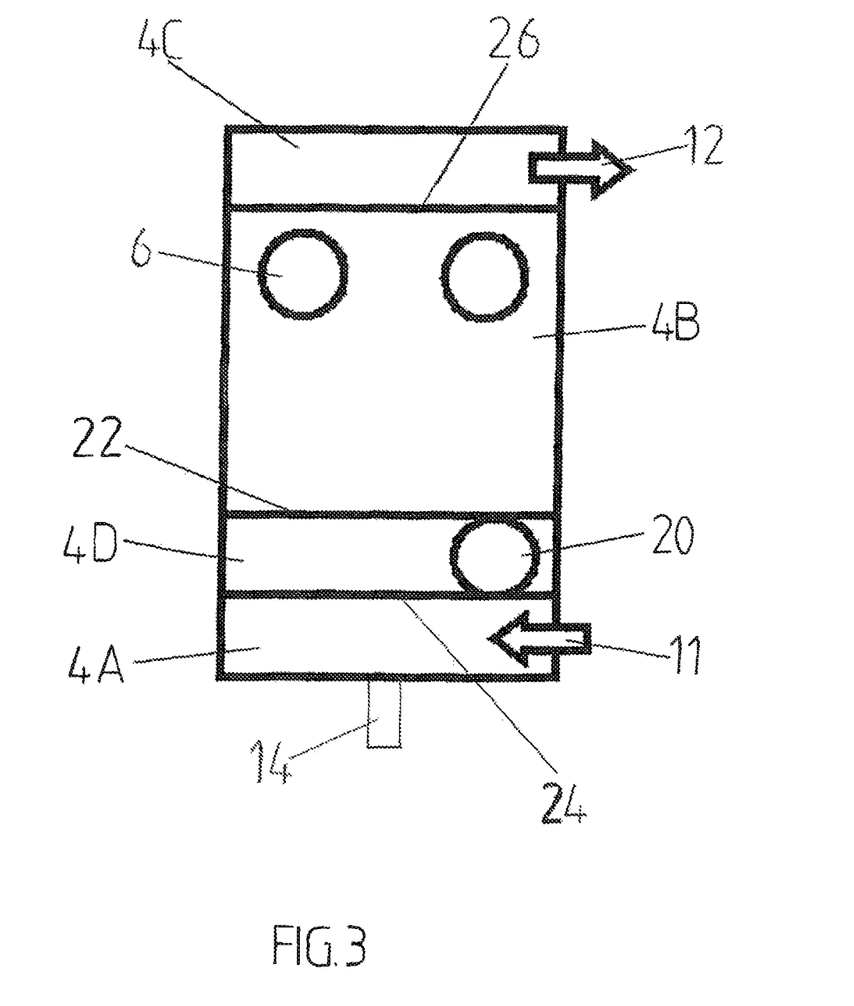
FIG. 3 shows a top view of the pyrolysis reactor of FIG. 2.

The pyrolysis reactor 4 comprises also one or more pyrolysis gas outlets 6 for removing pyrolysis gases formed from the solid fuel out of the pyrolysis reactor 4. The pyrolysis gas outlets 6 are arranged in the pyrolysis section 4B, as shown in FIGS. 2 and 3. One or more moisture outlets 20 are provided in the drying section 4D for removing the moisture containing gases separated from the solid fuel in the drying section 4D. The moisture outlets 20 are arranged on the top wall 46 of the pyrolysis reactor 4 in the drying section 4D and the one or more pyrolysis gas outlets 6 are arranged on the top wall 46 of the pyrolysis reactor 4 in the pyrolysis section 4B.

The drying section 4D and the pyrolysis section 4B are separated from each other by means of a partition wall 22. The partition wall 22 extends from the top wall 46 of the pyrolysis reactor 4 to a distance from the bottom 48 of the pyrolysis reactor 4, as shown in FIG. 2. The moisture containing gases separated from the solid fuel in the drying section 4D raise upwardly with the fluidizing gas supplied from the bottom 48 of the pyrolysis reactor 4 and do not enter the pyrolysis section 4B. The partition wall 22 may also extend little distance into the bed material 40 as shown in FIG. 2. The mixture of bed material and solid fuel move towards the pyrolysis section 4B through the space between the partition wall 22 and the bottom of the pyrolysis reactor. Alternatively partition wall 22 may extend from the bottom 48 of the pyrolysis reactor 4 to a distance from the top wall 46 of the pyrolysis reactor 4. In that case fluidizing gas has to fed to the drying section 4D with such a speed that it transports the bed material 40 and the solid fuel over the partition wall 22. Furthermore, in this embodiment, a separator (not shown) has to be used in connection with the moisture outlet 20 for separating the bed material 40 from the moisture containing gases.

In the embodiment shown in FIG. 2, the pyrolysis reactor 4 is divided in the movement direction of the solid fuel into four sections: entry section 4A, drying section 4D, pyrolysis section 4B and discharge section 4C. The entry section 4A comprises one or more bed material inlets 11 and it is arranged upstream of the drying section 4D. The discharge section 4C comprises one or more bed material outlets 12 and is arranged downstream of the pyrolysis section 4B. The entry section 4A and the drying section 4D are separated from each other by means of partition wall 24. The drying section 4D and the pyrolysis section 4B are separated from each other by means of partition wall 22. A partition wall 26 separates the pyrolysis section 4B and discharge section 4C. The partition walls 24, 26 are arranged to extend from the top wall 46 of the pyrolysis reactor 4 to a distance from the bottom 48 of the pyrolysis reactor 4. The partition walls may also be arranged, if preferred, to extend from the bottom 48 of the pyrolysis reactor 4 to a distance from the top wall 46 of the pyrolysis reactor 4. Since the fluidizing nozzles are distributed evenly between the bed material inlets 11 and bed material outlets, the fluidization is formed in every section.

FIG. 3 shows schematically a top view of the pyrolysis reactor 4 of FIG. 2. The bed material is supplied into the entry section 4A through bed material inlet 11 substantially in horizontal direction and the fuel to be pyrolyzed is supplied into the entry section 4A also substantially horizontally direction, as shown in FIG. 3. From the entry section the mixture of bed material and fuel is passed horizontally to the drying section 4D where the fuel is dried and the moisture containing gases are removed from the drying section 4D through moisture outlet 20. The mixture of bed material and dried fuel is further passed to the pyrolysis section 4B where the dried fuel is pyrolyzed for removing pyrolysis gases from the dried fuel. The pyrolysis gases are removed from the pyrolysis section through pyrolysis gas outlets 6. The bed material and remaining components of the fuel are then passed to the discharge section 4C from where they are removed from the pyrolysis reactor 4 through bed material outlet 12. As shown in FIGS. 2 and 3, the bed material is passed substantially horizontally through the pyrolysis reactor 4 together with the fuel and the gases separated from the fuel are removed from the pyrolysis reactor substantially in vertical direction.

Figure 4:
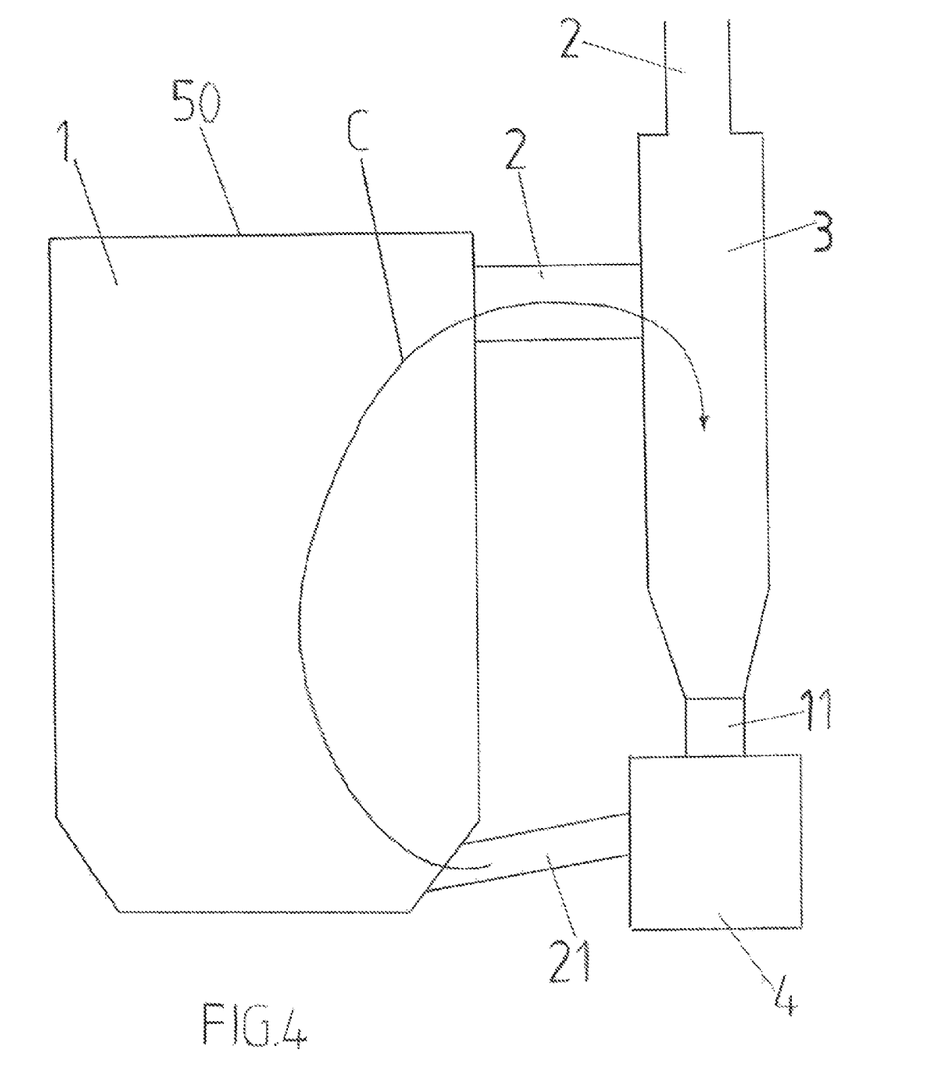
FIG. 4 schematic view of a pyrolysis reactor arranged in connection with a circulating fluidized bed boiler.

FIG. 4 shows a pyrolysis apparatus provided in connection with a circulating fluidized bed boiler 50. Arrow C shows the route of the bed material in the boiler 50. The boiler comprises a combustion chamber 1, flue gas channel 2 and a separator 3 for separating the bed material from the flue gases. The pyrolysis reactor 4 is arranged between the separator 3 and the combustion chamber 1 of the circulating fluidized bed boiler 50. The bed material from the separator 3 is circulated through the pyrolysis reactor 4 into the combustion chamber 1. The bed material is fed to the pyrolysis reactor 4 via supply conduit 11 from the separator 3 and recycled back to the combustion chamber via recycle conduit 21.

Figure 5:
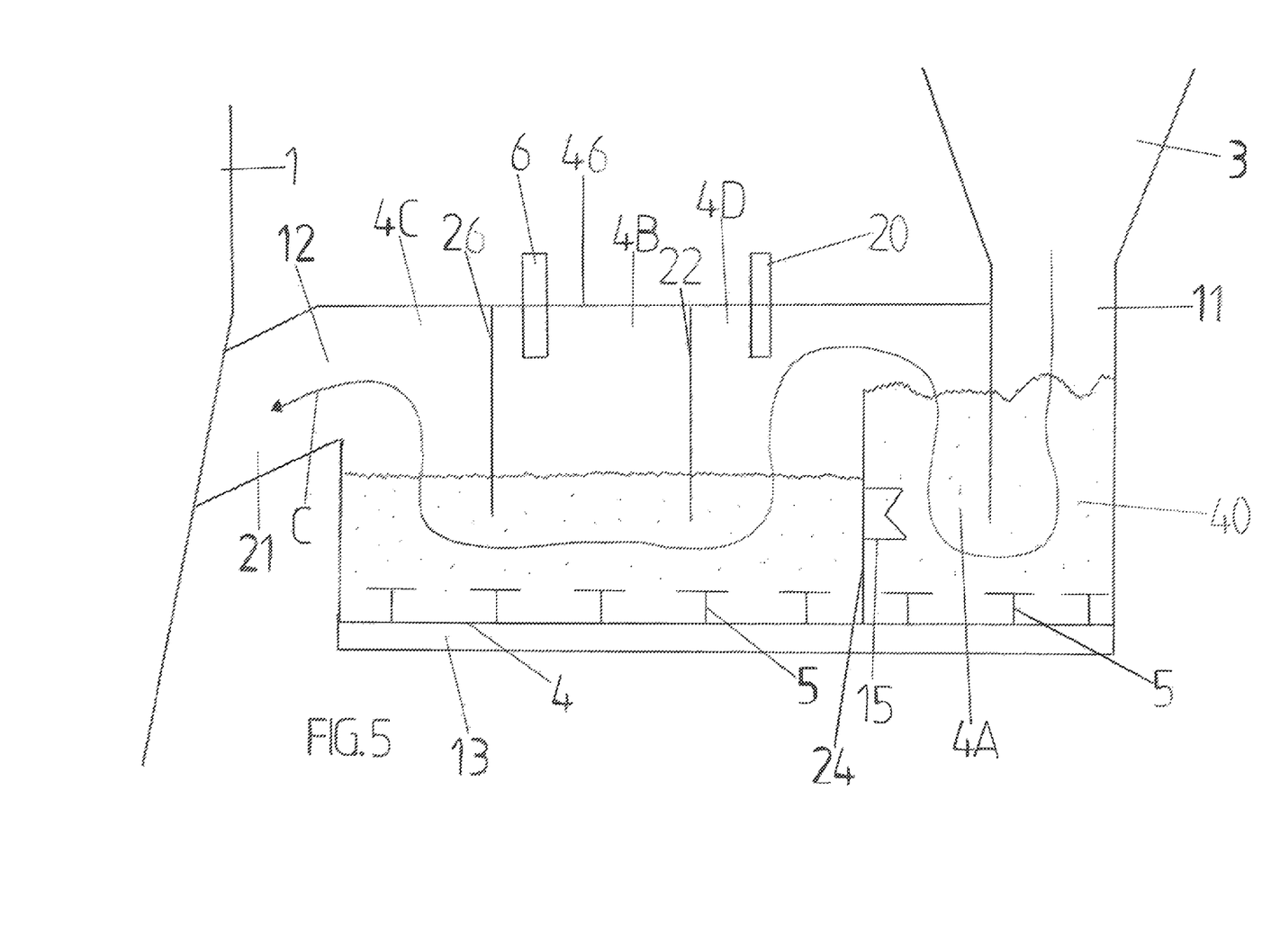
FIG. 5 shows a detailed view of the pyrolysis reactor of FIG. 4.

FIG. 5 shows the pyrolysis reactor 4 of FIG. 4 in detail. It corresponds basically to the pyrolysis reactor of FIGS. 2 and 3. The material inlet 11 supplies the bed material to the entry section 4A. The partition wall 24, that separates the entry section 4A and drying section 4D extends from the bottom 48 of the pyrolysis reactor 4 to a distance from the top wall 46 of the reactor 4. The surface of the bed material in the entry section 4A extends substantially to the height of the partition wall 24. In the following sections 4D, 4B and 4C the level of the bed material is lower than in the entry section. As is shown by the arrow C, the bed material travels from the entry section 4A through drying section 4D to the pyrolysis section 4B and finally to discharge section 4C. From there it is transported back to the combustion chamber 1 through bed material outlet 12 and via recycle conduit 21. In FIG. 5 the pyrolysis reactor 4 comprises a heat exchanger 15 in the entry section 4A for adjusting the temperature of the drying section 4D and/or pyrolysis section 4B. The temperature of the bed material 40 in the drying section 4D may be adjusted by placing a heat exchanger either in the drying section 4D or prior to the drying section 4D. Thus it is possible to arrange the heat exchanger 15 also in the drying section 4D. The heat exchanger 15 may be connected to the control means for adjusting the drying of the solid fuel in the drying section 4D.

Figure 6:
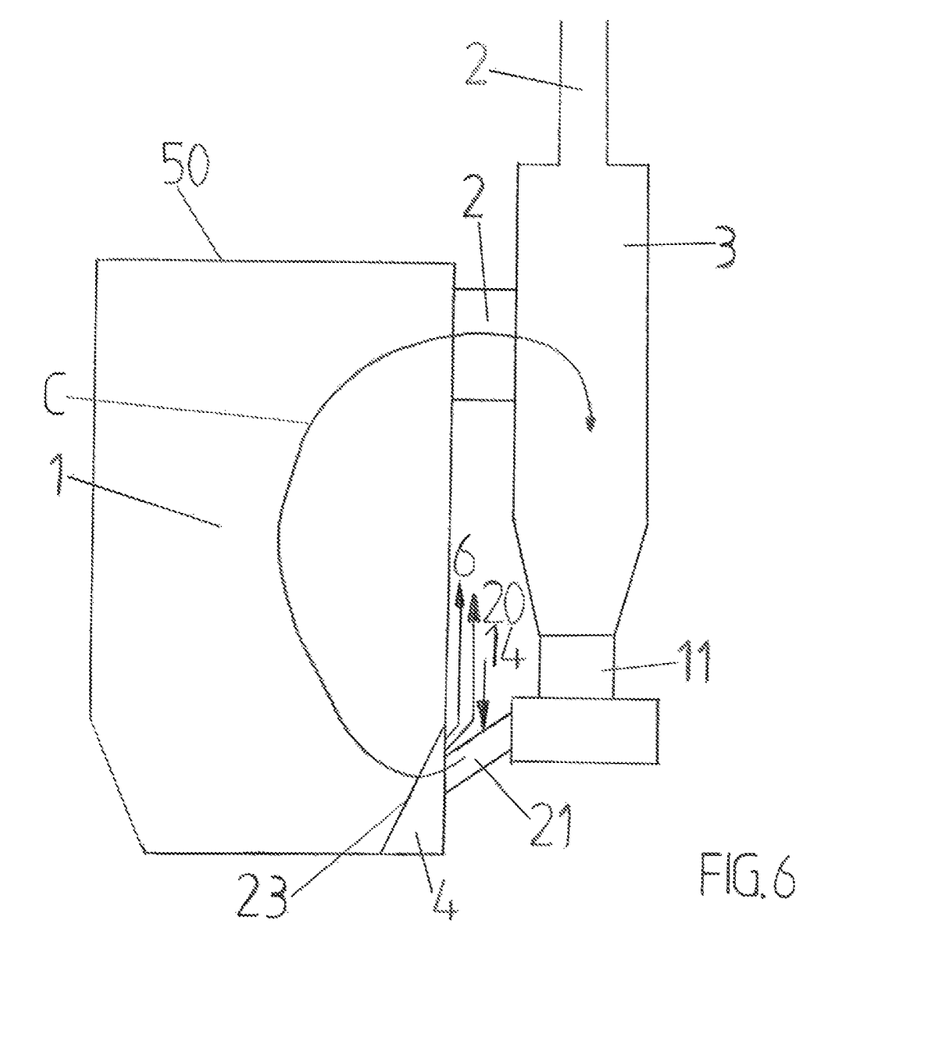
FIG. 6 shows another embodiment of a pyrolysis reactor arranged in connection with a circulating fluidized bed boiler.
Figure 7:
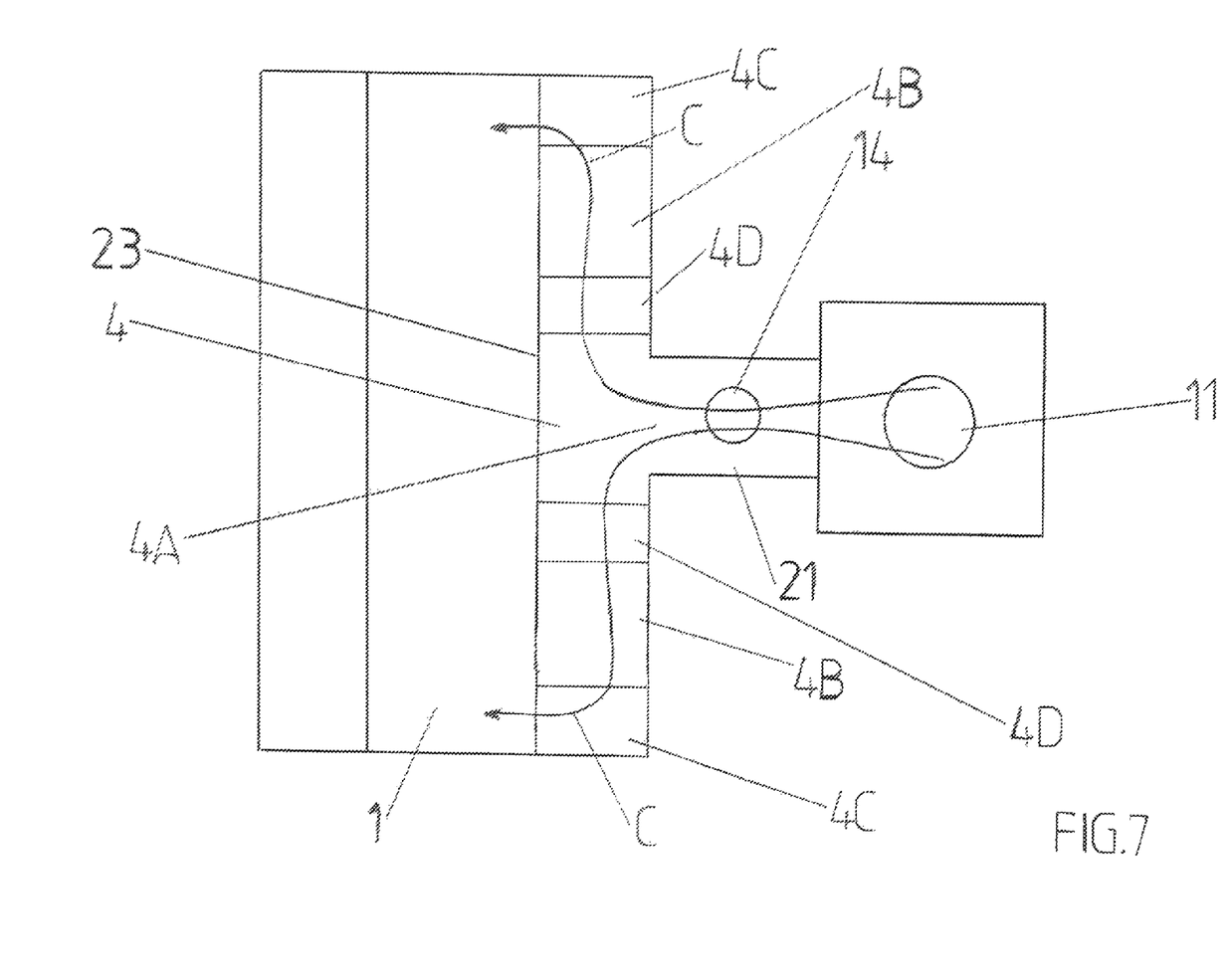
FIG. 7 shows detailed view of the pyrolysis reactor of FIG. 6.

FIGS. 6 and 7 show another embodiment in which the pyrolysis rector 4 is arranged adjacent to a wall of the combustion chamber 1 of circulating fluidized bed boiler 50 such that the combustion chamber 1 and the pyrolysis reactor have a common wall 23. In this embodiment the pyrolysis reactor 4 is downstream of the particle separator 3. FIG. 7 shows a horizontal cross-section view of the pyrolysis reactor 4 and the combustion chamber 1 of FIG. 6. The bed recycle conduit 21 supplies bed material into the pyrolysis reactor 4 and one or more fuel inlets 14 is arranged to the recycle conduit 21 forming at least partly the entry section 4A of the pyrolysis reactor 4, as shown in FIG. 7. The pyrolysis reactor 4 is further divided into drying section 4D and pyrolysis section 4B according to the present invention. The drying section 4D and pyrolysis section 4B are arranged transversely in relation to the supply direction of the bed material. The mixture of bed material and the fuel is passed from the entry section 4A into the drying section 4D and further into the pyrolysis section 4B. The entry section 4A, drying section 4D, pyrolysis section 4B and discharge section may be implemented as described above in connection with FIGS. 2, 3 and 5. From the discharge section 4C the bed material and remaining of the fuel are supplied into the combustion chamber 1 through bed material outlets in the common wall 23.

The pyrolysis apparatus further comprises control system for controlling the drying of the solid fuel in the drying section 4D and consequently, for controlling the water content of the pyrolysis oil. The control system is shown schematically in FIG. 1. The control system comprises a control unit 32 and a water content analyzer 34. The water content analyser 34 analyzes the water content of the produced pyrolysis oil and it is preferably an on-line water content analyzer connected to conduit 9. The control unit 32 comprises receiving means for receiving the measurement signals from the water content analyzer, calculating means for forming control signals and transmitting means for transmitting the formed control signals to the process. The calculating means comprise algorithms for conditioning the measurement signals and forming the control signals for controlling the drying of the solid fuel in the drying section 4D. The control system also comprises signal transmitting lines for transmitting the control signals to the process. The signal transmitting lines are shown in FIG. 1 as dashed lines.

The water content of the pyrolysis oil is controlled by controlling the drying of the solid fuel in the drying section 4D. The measurement signals of the water content of the pyrolysis oil are transmitted from the analyzer 34 to the control unit 32 via line 25. The control unit 32 forms control signals for the process i.e. for controlling the drying of the solid fuel.

The drying of the solid fuel may be accomplished in many ways, of which some examples are explained below. The drying of the solid fuel may be controlled by adjusting the removal rate of moisture containing gases out of the drying section 4D. The control means calculates and transmits control signals as a response to the moisture content of the produced pyrolysis oil for an adjusting means (not shown in the figure) that is connected to the moisture outlet 20. The control signals are transmitted via line 38 to the control means. The drying of the solid fuel may also be controlled by adjusting the residence time of the solid fuel in the drying section 4D. This is done by adjusting the movement speed of the solid fuel through drying zone. In this case, the control means calculate control signals for adjusting the velocity of the fluidizing gas fed in to the drying zone. The control signals are transmitted via line 41 to the control means controlling the velocity of the fluidizing gas (not shown in the Figure). The drying of the solid fuel may also be adjusted by controlling the supply rate of solid fuel into the pyrolysis reactor 4. Increasing the supply rate of the solid fuel and keeping other parameters constant may decrease the drying of the solid fuel, and vice versa. The control signals for controlling the supply rate of the solid fuel into the pyrolysis reactor are transmitted to the fuel supply system (not shown in the Figure) via line 44. Furthermore, the drying of the solid fuel may be controlled by adjusting the temperature in the drying section 4D. Temperature of the drying section may be adjusted by adjusting the temperature of the bed material in the drying section. The temperature of the bed material may be adjusted with a heat exchanger 15 adapted for adjusting the temperature of the bed material 40 in the drying section 4D or prior to the drying section 4D. The heat exchanger 15 may be placed in entry section 4A and/or in the drying section 4D, as shown in FIG. 5. The control signals for the heat exchanger 15 are transmitted via line 42.

It will be obvious to a person skilled in the art that, as the technology advances, the inventive concept can be implemented in various ways. The invention and its embodiments are not limited to the examples described above but may vary within the scope of the claims.

The invention claimed is:

1. A method of carrying out pyrolysis process in a pyrolysis apparatus for solid fuel to produce pyrolysis oil, whereby the pyrolysis process is carried out in connection with a fluidized bed boiler, and supplying heat required for the pyrolysis process at least partly by bed material of the fluidized bed boiler, the method comprising steps of:
   supplying solid fuel into a drying zone in the pyrolysis reactor;
   drying the solid fuel in the drying zone and removing moisture containing gases from the solid fuel from the drying zone;
   passing the dried solid fuel and the bed material essentially horizontally from the drying zone to the pyrolysis zone arranged sequentially in horizontal direction in the pyrolysis reactor;
   pyrolysing the dried solid fuel for separating pyrolysis gases from the dried solid fuel and removing the pyrolysis gases from the pyrolysis zone;
   whereby the moisture containing gases separated from the solid fuel in the drying zone and the pyrolysis gases separated in the pyrolysis zone are removed separately; and
   passing the pyrolysis gases from the pyrolysis reactor to a condenser for producing pyrolysis oil.

2. A method according to claim 1, wherein the method further comprises exhausting the moisture containing gases out of the pyrolysis reactor in the drying zone.

3. A method according to claim 1, wherein the method further comprises controlling moisture content of the pyrolysis oil by adjusting the drying of the solid fuel in the drying zone.

4. A method according to claim 3, wherein the method further comprises analysing the moisture content of the produced pyrolysis oil for controlling the drying of the solid fuel in the drying zone.

5. A method according to claim 2, wherein the method further comprises controlling moisture content of the pyrolysis oil by adjusting the drying of the solid fuel in the drying zone.

6. A method according to claim 1, wherein the method further comprises adjusting residence time of the solid fuel in the drying zone.

7. A method according to claim 6, wherein the method further comprises adjusting the residence time of the solid fuel in the drying zone by adjusting the movement speed of the solid fuel through drying zone.

8. A method according to claim 3, wherein the method further comprises adjusting the temperature in the drying zone.

9. A method according to claim 3, wherein the method further comprises adjusting the supply rate of solid fuel into the pyrolysis reactor.

10. A method according to claim 3, wherein the method further comprises adjusting the removal rate of moisture containing gases from the drying zone.

11. A method according to claim 1, wherein the method further comprises drying the solid fuel in the drying zone to moisture content 4 to 10 weight-%.

12. A method according to claim 1, wherein the method further comprises carrying out the pyrolysis process using the bed material of the fluidized bed boiler which bed material of the fluidized bed boiler is circulated through the pyrolysis reactor and fluidized in the pyrolysis reactor by fluidizing gas, the pyrolysis gases separated from the solid fuel in the pyrolysis reactor are condensed in to liquid form as pyrolysis oil, in which method the bed material of the fluidized bed boiler and the solid fuel are passed through the pyrolysis reactor in transverse direction in relation to the flow direction of the fluidizing gas.

13. A method according to claim 12, wherein the method further comprises passing the bed material and the solid fuel essentially in horizontal direction through the pyrolysis reactor, and that the fluidizing gas is fed to the pyrolysis process underneath the bed material.

14. A method according to claim 11, wherein the method further comprises controlling temperature in the drying zone by adjusting temperature of the bed material supplied to the drying zone of the pyrolysis reactor.

15. A method according to claim 12, wherein the method further comprises controlling temperature in the drying zone by adjusting temperature of the bed material supplied to the drying zone of the pyrolysis reactor.

16. A method according to claim 11, wherein the method further comprises adjusting the drying of the solid fuel in the drying zone by adjusting the speed of the fluidizing gas fed in to the drying zone.

17. A method according to claim 11, wherein the method further comprises adjusting the drying of the solid fuel in the drying zone by adjusting the speed of the fluidizing gas fed in to the drying zone.

18. A method according to claim 11, wherein the method further comprises feeding bed material to the pyrolysis process from a fluidized bed boiler, wherein
   a fluidized bed boiler is selected from the group consisting of bubbling fluidized bed boiler and circulating fluidized bed boiler.

19. A method according to claim 12, wherein the method further comprises feeding bed material to the pyrolysis process from a fluidized bed boiler, wherein
   a fluidized bed boiler is selected from the group consisting of bubbling fluidized bed boiler and circulating fluidized bed boiler.

20. A method according to claim 11, wherein the method further comprises using wood, wood chips, saw dust, peat or any other solid biomass as solid fuel to be pyrolyzed.

21. A method according to claim 12, wherein the method further comprises using wood, wood chips, saw dust, peat or any other solid biomass as solid fuel to be pyrolyzed.

22. A pyrolysis apparatus comprising a pyrolysis reactor for pyrolysing solid fuel and a condenser for condensing pyrolysis gases separated from the solid fuel into pyrolysis oil, whereby the pyrolysis reactor is arranged in connection with a fluidized bed boiler for supplying heat required for the pyrolysis of the solid fuel at least partly by bed material of the fluidized bed boiler, wherein
   the pyrolysis reactor comprises a drying section for drying solid fuel supplied to the pyrolysis reactor, one or more moisture outlets provided in the drying section for removing from the drying section the moisture containing gases separated from the solid fuel in the drying section, a pyrolysis section for pyrolysing the solid fuel dried in the drying section, and one or more pyrolysis gas outlets arranged in the pyrolysis section for removing the pyrolysis gases from the pyrolysis section and for conducting pyrolysis gases separated from the solid fuel to the condenser, and that the drying section and the pyrolysis section are arranged sequentially in horizontal direction such that bed material and the dried solid fuel are passed essentially in horizontal direction from the drying section to the pyrolysis section, whereby the moisture containing gases separated from the solid fuel in the drying section and the pyrolysis gases separated in the pyrolysis section are removed separately.

23. A pyrolysis apparatus according to claim 22, wherein the apparatus comprises controller for controlling the drying of the solid fuel in the drying section as a response to the moisture content of the produced pyrolysis oil.

24. A pyrolysis apparatus according to claim 23, wherein the controller comprise water content analyser for measuring the water content of the produced pyrolysis oil.

25. A pyrolysis apparatus according to claim 22, wherein the controller are arranged to adjust the movement speed of the solid fuel or the solid particle bed material in the drying section, and/or to adjust the temperature in the drying section by a heat exchanger and/or to adjust supply rate of solid fuel into the pyrolysis reactor and/or to adjust the removal rate of the moisture containing gases from the drying section.

26. A pyrolysis apparatus according to claim 22, wherein the pyrolysis reactor further comprises:
one or more solid fuel inlets for supplying solid fuel to be pyrolyzed in to the pyrolysis reactor;
one or more bed material inlets for feeding hot solid particle bed material into the pyrolysis reactor;
one or more bed material outlets for discharging the hot solid particle bed material from the pyrolysis reactor;
fluidizing nozzles for supplying fluidizing gas into the pyrolysis reactor, the fluidizing nozzles being arranged between the bed material inlets and the bed material outlets to provide a cross-flow of the fluidizing gas in relation to the movement direction of the solid fuel and the bed material;
one or more pyrolysis gas outlets for extracting pyrolysis gases separated from the solid fuel out of the pyrolysis reactor.

27. A pyrolysis apparatus according to claim 26, wherein the controller are arranged to adjust temperature of the bed material fed into the pyrolysis reactor and/or to adjust the speed of the fluidizing gas supplied to the drying section of the pyrolysis reactor.

28. A pyrolysis apparatus according to claim 22, wherein the pyrolysis reactor comprises a heat exchanger for adjusting the temperature of the drying section and/or pyrolysis section.

29. A pyrolysis apparatus according to claim 28, wherein the heat exchanger is adapted for adjusting the temperature of the solid particle bed material in the drying section or prior to the drying section.

30. A pyrolysis apparatus according to claim 22, wherein the fluidizing gas is fed to the pyrolysis process underneath the fluidized bed.

31. A pyrolysis apparatus according to claim 22, wherein the drying section comprises one or more moisture outlets for exhausting the moisture containing gas from the drying section.

32. A pyrolysis apparatus according to claim 22, wherein the drying section and the pyrolysis section are separated from each other by means of a partition wall.

33. A pyrolysis apparatus according to claim 32, wherein the pyrolysis reactor comprises a top wall and a bottom and that the partition wall extends from the top wall to a distance from the bottom of the pyrolysis reactor.

34. A pyrolysis apparatus according to claim 32, wherein the partition wall extends from the bottom of the pyrolysis reactor to a distance from the top wall of the pyrolysis reactor.

35. A pyrolysis apparatus according to claim 22, wherein the pyrolysis reactor is further divided in the movement direction of the solid fuel into entry section upstream of the drying section, the entry section comprising the one or more bed material inlets, and into a discharge section downstream of the pyrolysis section, the discharge section for discharging bed material from the pyrolysis reactor.

36. A pyrolysis apparatus according to claim 35, wherein the entry section and the drying section as well as the pyrolysis section and the discharge section are separated from each other by means of partition walls extending from the top wall of the pyrolysis reactor to a distance from the bottom of the pyrolysis reactor.

37. A pyrolysis apparatus according to claim 22, wherein the pyrolysis reactor is arranged in immediate connection with a bubbling fluidized bed boiler for circulating bed material of the bubbling fluidized bed boiler through the pyrolysis reactor.

38. A pyrolysis apparatus according to claim 22, wherein the pyrolysis reactor is arranged in connection with a circulating fluidized bed boiler for circulating bed material of the circulating fluidized bed boiler through the pyrolysis reactor.

39. A pyrolysis apparatus according to claim 38, wherein the circulating fluidized bed boiler comprises a separator for separating bed material from the flue gases, and that the pyrolysis reactor is arranged between the separator and the combustion chamber of the circulating fluidized bed boiler for circulating the solid particle bed material from the separator through the pyrolysis reactor into the combustion chamber.

* * * * *